United States Patent
Duan et al.

(10) Patent No.: US 9,608,430 B2
(45) Date of Patent: Mar. 28, 2017

(54) BATTERY CIRCUIT FAULT PROTECTION IN UNINTERRUPTABLE POWER SOURCES

(71) Applicant: International Business Machines Corporation, Armonk, NY (US)

(72) Inventors: Jiwu Duan, Tucson, AZ (US); John C. Elliott, Tucson, AZ (US); Dennis W. Fried, Tucson, AZ (US); Steven M. Groff, Tucson, AZ (US); Trung Le, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 13/860,977

(22) Filed: Apr. 11, 2013

(65) Prior Publication Data

US 2014/0307358 A1 Oct. 16, 2014

(51) Int. Cl.
*H02H 3/00* (2006.01)
*H02H 3/087* (2006.01)
*H02H 7/18* (2006.01)
*H02H 3/02* (2006.01)
*H02H 3/093* (2006.01)

(52) U.S. Cl.
CPC .......... *H02H 3/087* (2013.01); *H02H 7/18* (2013.01); *H02H 3/025* (2013.01); *H02H 3/093* (2013.01)

(58) Field of Classification Search
USPC ........................................... 361/55
See application file for complete search history.

(56) References Cited

U.S. PATENT DOCUMENTS

| | | | | |
|---|---|---|---|---|
| 3,262,018 A * | 7/1966 | Renaat | ................... | H02H 3/021 307/328 |
| 5,835,324 A * | 11/1998 | Hatton | ................... | H02H 3/006 340/638 |
| 5,856,711 A * | 1/1999 | Kato | ..................... | H02H 3/087 307/10.6 |
| 6,331,763 B1 * | 12/2001 | Thomas | ................ | H02H 9/042 320/136 |
| 6,411,190 B1 * | 6/2002 | Yamaguchi | ............ | H01H 39/00 180/279 |
| 6,687,103 B2 * | 2/2004 | Pannwitz | ............. | H02J 7/0031 361/56 |
| 7,626,895 B2 | 12/2009 | Goodman et al. | | |
| 7,694,115 B1 * | 4/2010 | Porras | ................ | H04L 12/2602 340/506 |

(Continued)

FOREIGN PATENT DOCUMENTS

JP 2001025150 A 1/2001

OTHER PUBLICATIONS

International Search Report and Written Opinion for PCT Application No. PCT/IB2014/059386 dated Jun. 10, 2014.

*Primary Examiner* — Ronald W Leja
(74) *Attorney, Agent, or Firm* — Terrile, Cannatti, Chanbers & Holland, LLP; Stephen A. Terrile (57) ABSTRACT

A power system which includes a battery (or string of batteries) as well as a preemptive fuse driver, PFD, system. The PFD protection system reliably protects circuits that could be damaged by long term fault currents. More specifically, the PFD protection system includes a sensor and a controller as well as a controlled switch. The controller includes a PFD control module which allows protection to be tuned specifically to the source and load characteristics.

15 Claims, 5 Drawing Sheets

(56) References Cited

U.S. PATENT DOCUMENTS

| | | |
|---|---|---|
| 8,097,978 B2 | 1/2012 | Groff et al. |
| 8,174,804 B2 | 5/2012 | Fasano |
| 2003/0025480 A1 | 2/2003 | Pannwitz |
| 2003/0113600 A1* | 6/2003 | Wardrop ............ H01M 8/04559 429/432 |
| 2007/0159138 A1* | 7/2007 | Furuuchi ................. H02H 7/18 320/134 |
| 2008/0304199 A1* | 12/2008 | Cruise ............... H01M 10/4207 361/101 |
| 2011/0175699 A1 | 7/2011 | Huss et al. |
| 2013/0308356 A1* | 11/2013 | Subramanium ........... H02J 5/00 363/53 |
| 2014/0030557 A1* | 1/2014 | Kim .................... H01M 10/425 429/7 |
| 2014/0307358 A1* | 10/2014 | Duan .................... H02H 3/087 361/93.1 |

* cited by examiner

BATTERY CIRCUIT FAULT PROTECTION IN UNINTERRUPTABLE POWER SOURCES

BACKGROUND OF THE INVENTION

Field of the Invention

The present invention relates in general to the field of power supplies and, more particularly to fault protection in uninterruptible power sources.

Description of the Related Art

It is known to provide data processing systems such as those that include data storage systems with an uninterruptible power source (UPS). For large scale data processing systems, the UPS can include a plurality of high current batteries, often configured in long strings, to supply energy to the UPS. These batteries are often protected by fuses and/or circuit breakers. However, even with fuses and/or circuit breakers it is desirable to provide additional fault protection for high current batteries such as those configured in long strings of batteries.

External circuit protection is extremely important to battery powered circuits. Batteries by design have as little current limiting as possible, to minimize internal losses. Reliable circuit protection is especially important for long strings of batteries which can supply both high peak DC currents and higher voltage that may drive destructive arcing and burning in the event of a fault condition. Known circuit protection devices (like fuses and circuit breakers) are capable of almost instantly interrupting fault currents that are greater than 250% to 500% of their ratings. However, by selecting a circuit protection device that will never trip at the largest expected operating current of the circuit, the same device will likely not be able to guarantee opening quickly enough under fault currents that are below about 250% of the rated current. These moderate fault currents (so called "soft shorts") can potentially cause slow temperature rises, melting, arcing and fire if given enough time. For many known circuit protection devices, the time to trip or even to open at all is not necessarily accurately predictable in the range of fault current below about 250% the rating.

Another known electronic or intelligent circuit protection includes a switch in series with the load. The switch is normally conduction then held open when fault currents are detected. Additionally, electronic current limiting and/or electronic over current shutdown features are commonly used by electronic power supplies and power converters. These power supplies already have switches in series with the load current, so little additional hardware is required to implement this type of circuit protection.

It is known to state circuit energy (power×time) as "I squared t" ($I^2t$). There is a trend toward reducing the $I^2t$ of normally robust power distribution components to meet cost, weight and size reduction goals. A predictable trip time for battery circuit protection is desirable to protect these lower rated power distribution conductors and interconnection.

SUMMARY OF THE INVENTION

In accordance with the present invention, a method and apparatus are provided which reliably protects circuits that could be damaged by long term fault currents below about 250% of a maximum operating current. More specifically, the method and apparatus includes a Preemptive Fuse Driver (PFD) protection circuit which includes a sensor and a controller as well as a controlled switch. The controller includes a PFD control module which allows protection to be tuned specifically to the source and load characteristics of the battery. In certain embodiments, the tuning may be performed in real time. The PFD protection circuit provides predictable interruption of moderate battery currents (e.g., currents up to 250% of the rating of the battery) as well as forcing high battery currents (e.g., currents greater than 250% to 500% of the rating of the battery) through the switch causing the switch to substantially instantly open (i.e., to open before causing a load circuit to smoke, burn or catch fire).

In certain embodiments, the PFD protection circuit is provided within a system which also includes an additional agency recognized circuit protection device (e.g., a commercial fuse or circuit breaker that has been tested and approved safe by a safety agency such as the Underwriters Laboratory (UL), Canadian Standards Association (CSA) or Community Europe (CE) safety agencies. The PFD protection circuit increases the accuracy and repeatability of a device trip point and is especially beneficial when the fault current is below about 250% of the rated current. At fault currents greater than 250% the agency recognized circuit protection device, can be relied upon to quickly open.

The PFD protection circuit also allows batteries to source larger currents (e.g., greater than 300% to 500% of the rated current of the battery) for relatively short amounts of time (e.g., an amount of time which is much less (e.g., less than 50%) than an amount of time required for a load circuit to smoke, burn or catch fire under fault current conditions below 250% of the circuit protection device trip current). Additionally, the PFD protection circuit provides battery circuit protection with increased accuracy and repeatability as compared to stand-alone circuit protection. Additionally, providing the PFD control module allows protection tuned specifically to the source and load characteristics and even adapting in real time. Additionally, providing the PFD protection circuit with a controlled switch (such as a shunt or crowbar switch) adds no additional power losses to the battery protection, because the switch only conducts current instantaneously when the circuit is tripped. Because the switch only conducts current when the protection circuit is tripped minimizes any need for PFD switch heat sinks.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Many of the functional units described in this specification have been labeled as modules, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, among different processors, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of causing execution of a program of machine-readable instructions on a digital processing apparatus. A computer readable medium may be embodied by a compact disk, digital-video disk, a magnetic tape, a Bernoulli drive, a magnetic disk, holographic disk or tape, a punch card, flash memory, magnetoresistive memory, integrated circuits, or other digital processing apparatus memory device.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
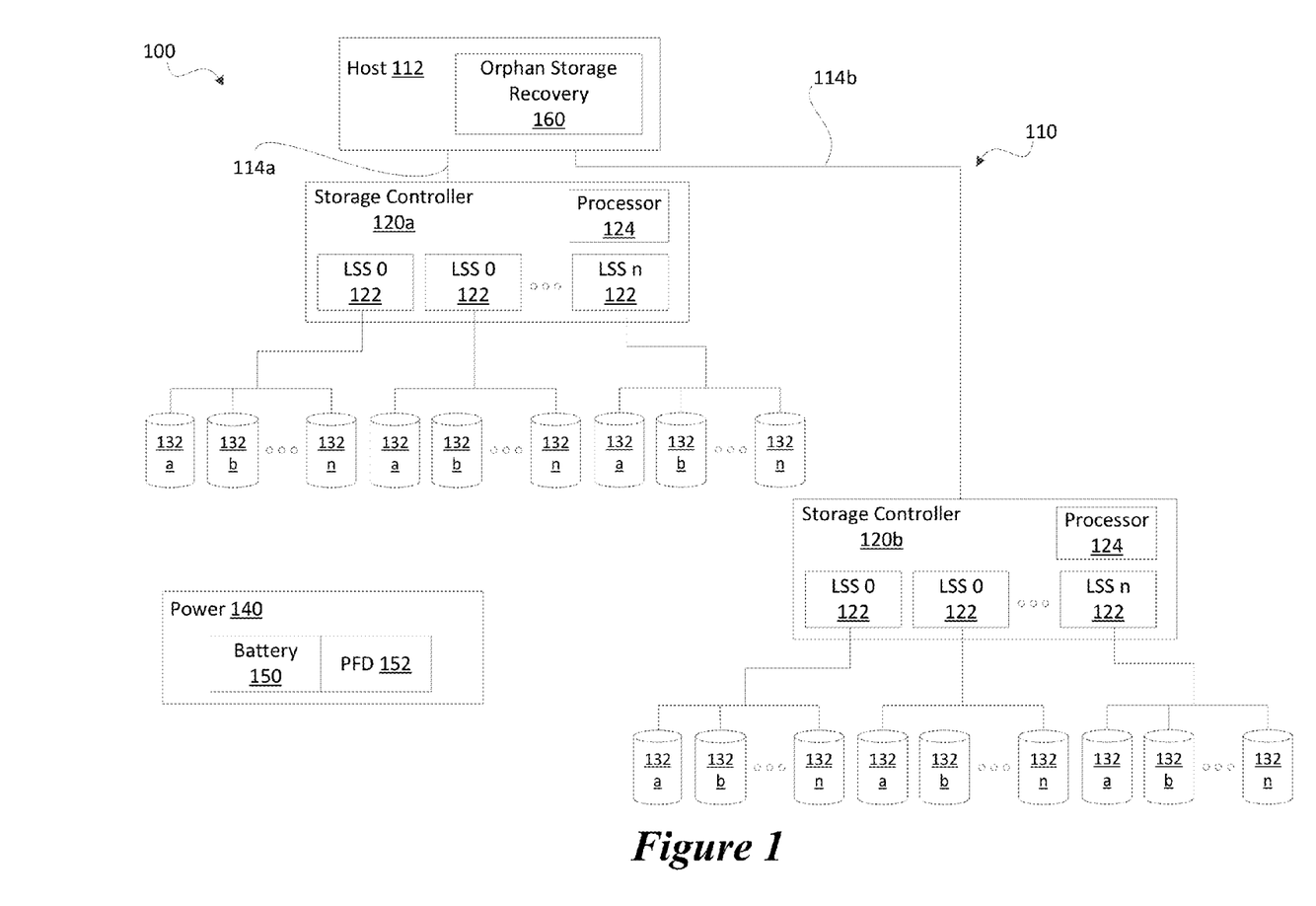
FIG. 1 shows a block diagram of a data processing system.

Referring now to FIG. 1, a data processing system 100 comprises data storage system 110 and one or more host computers 112 (also referred to as hosts). The storage system 110 is in communication with host computer 112 via communication paths 114a, 114b. Communication paths 114a, 114b each comprise a communication link, where that communication link can be configured to comprise up to 256 logical pathways. The illustrated embodiment shows a single host computer. In other embodiments, data storage system 110 may be in communication with a plurality of host computers.

Although the system is described in terms of a storage control unit or "controller" and logical storage subsystems (LSS), the system may be implemented with other devices as well. The storage system 110 includes a storage system such as those available from International Business Machines under the trade designation IBM DS6000 or DS8000. In certain embodiments, the storage system 110 includes two storage controllers 120a and 120b, storage devices 122, such as hard disk drivers (HDDs). In certain embodiments, the storage system can further include an interface, such as an IBM Enterprise Storage Server Network Interface (ESSNI) or other interface.

The host 112 is coupled to the storage controller via appropriate connections through which commands, queries, response and other information are exchanged. The storage controller 120 may be configured with one or more logical storage subsystems (LSSs) 132 (e.g., LSS 0, LSS 1, ... LSS n). Each LSS is assigned one or more storage devices 132.

The data processing system further includes a power system 140, such as a power supply or a UPS system, which provide power to the components of the data processing system such as the data storage system 110 and the host computers 112. The power system 140 includes a battery (or string of batteries) 150 as well as a PFD protection system 152. The PFD protection system 152 reliably protects circuits that could be damaged by long term fault currents below about 250% of a maximum operating current. More specifically, the PFD protection system includes a sensor and a controller as well as a controlled switch. The controller includes a PFD control module which allows protection to be tuned specifically to the source and load characteristics of the battery. In certain embodiments, the tuning may be performed in real time. The PFD protection circuit provides predictable interruption of moderate battery currents (e.g., currents up to 250% of the rating of the battery) as well as forcing high battery currents (e.g., currents greater than 300% to 500% of the rating of the battery) through the switch causing the switch to substantially instantly open.

Figure 2:
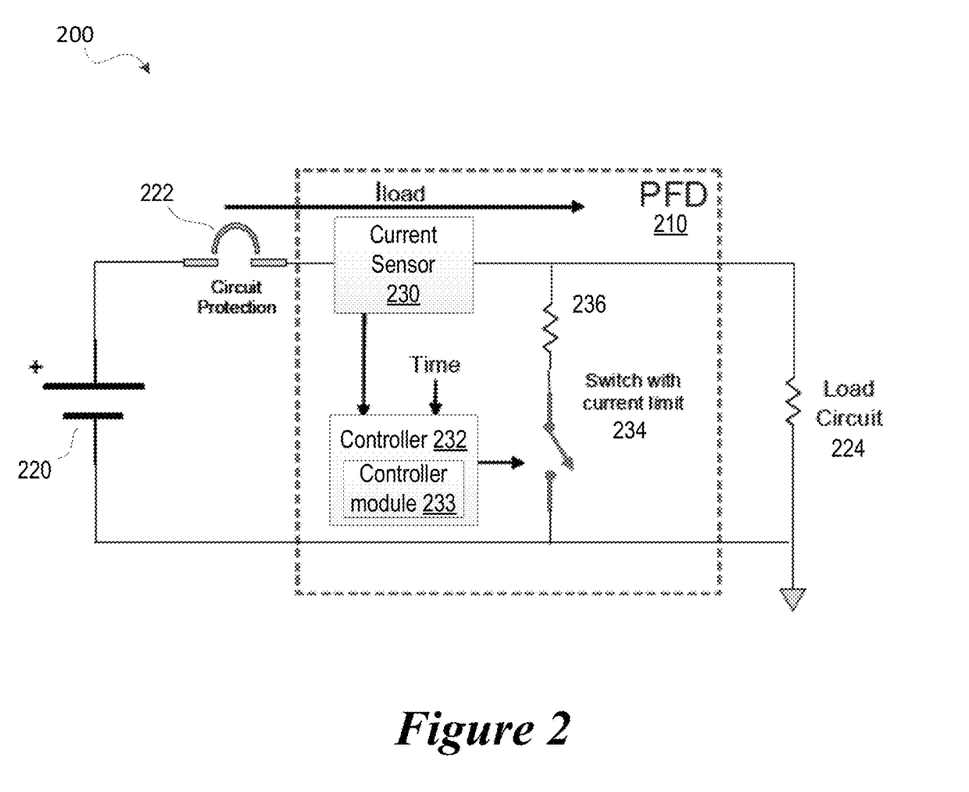
FIG. 2 shows a block diagram of a battery system having a PFD protection circuit.

FIG. 2 shows a block diagram of a battery system 200 having a PFD protection circuit 210. The PFD protection circuit 210 is one example of the PFD protection system 152. More specifically, the battery system 200 includes a power source 220 (e.g., a battery or string of batteries), a circuit protection device 222, the PFD protection circuit 210 as well as a load circuit 224. In certain embodiments, the load circuit 224 comprises at least some components of the data processing system 100 such as components of the storage system 110.

The PFD protection circuit 210 includes a current sensor 230, a controller 232 (which includes a controller module 233) and a current limiting switch 234. The PFD protection circuit 210 further includes a resistor 236 coupled in series with the switch 234. The current limiting switch 234 and the resistor 236 are coupled in parallel with the load circuit 224.

The currently limiting switch 234 is any solid state or mechanical switching device that can handle high overload currents for a short period of time. For example in certain embodiments, the switch 234 may be Silicon-controlled rectifier (SCR), Insulated-gate bipolar transistor (IGBT) and metal-oxide-semiconductor field-effect transistor (MOSFET) power electronic switches that are fast acting and rated for high current. Under normal operating conditions the switch 234 is open. When a fault condition (e.g., via the current sensor 230 and the controller 232) is detected the switch 234 is closed and draws current through the circuit protection device that is limited to 250% to 500% of the protection device rating, causing the circuit protection device 222 to open instantly.

Figure 3:
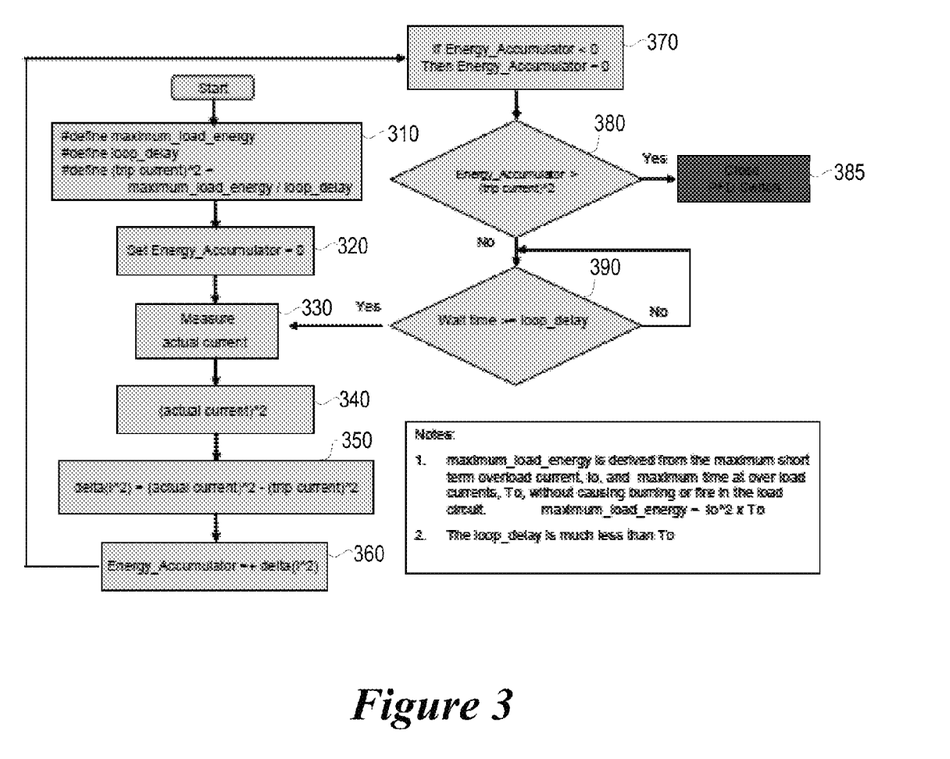
FIG. 3 shows a flow chart of the operation of a PFD protection circuit

FIG. 3 shows a flow chart of the operation of a PFD protection circuit. The current sensor 230 and the controller 232, which perform a fault condition detection function, may be as simple or as complex as required to protect the specific source and load circuits (e.g., source 220 and load 224). In general, the controller module 233 accumulates the energy transferred to the load and generates a command which causes the controller 232 to close the switch when the energy reaches a threshold. One input parameter to the controller is the maximum load energy. Where $$\text{Maximum load energy} = Io^2 \times To$$

Io=Maximum short term overload current without causing burning or fire in the load circuit; and,
To=time at maximum over load current The maximum load energy may be determined experimentally for a specific circuit to be protected. The function of the PFD protection circuit 210 provides a significant benefit when the maximum short term overload current is below 250% of the rated current.

In certain embodiments, the controller module 233 performs certain functions. More specifically, the controller module 233 begins operation at step 310 by determining the maximum load energy. Next, at step 320, the controller module 233 sets an energy accumulator value (Energy_Accumulator) to zero. Next at step 330, the controller module 233 obtains an actual current value from the current sensor 230. Next, at step 340, the controller module 233 calculates a squared value for the actual current (e.g., $I^2$). Next at step 350, the controller module 233 calculates an energy delta value, which is a result of the change in current squared, (deltaI=$I^2-I_t^2$). Next, at step 360, the controller module 233 calculates a new energy accumulator value (Energy_Accumulator=Energy_Accumulator+deltaI). E.g., the difference between the actual power and the trip power is added to the energy accumulator value. Next, at step 370, the controller module 233 determines whether the energy accumulator value is less than zero and if so, sets the energy accumulator value to zero. (During normal operation the calculated data value is negative. However, the energy accumulator value is limited to a minimum value of zero. Next at step 380, the controller module 233 determines whether the energy accumulator value is greater than a Trip_Current_Squared. The maximum_load_energy is calculated from two measured or derived values These two measured or derived values correspond to the maximum allowed overload current (Io) applied to the load circuit for the maximum amount of time (To) that will still not cause the load to smoke, burn or catch fire where: maximum_load energy=(Io^2)*To The time "loop_delay" is much smaller than To. When the maximum_load_energy is divided by loop_delay the result is a very large value, "Trip_Current_Squared".

If yes, then the controller module 233 causes the controller 232 to close the switch 234. If no, then the controller module 233 enters a wait mode of operation for a predetermined amount of time (e.g., where the predetermined amount of time equals a loop delay value). After the predetermined amount of time, the controller module 233 returns to step 230 to again obtain an actual current value from the current sensor 230.

Although the present invention has been described in detail, it should be understood that various changes, substitutions and alterations can be made hereto without departing from the spirit and scope of the invention as defined by the appended claims.

For example, because the fault interrupt is controlled by the controller module 233, a plurality of variables may be incorporated into the determination of whether to generate a fault interrupt. More specifically, variables incorporated into the determination of whether to generate a fault interrupt can include a peak current level, a current level plus a delay, a large negative slope of the battery voltage (e.g., $-d(Vbat)/dt$), a circuit temperature. Additionally, the controller module 233 may also adapt a maximum load computation ($I^2$) to a particular circuit mode or configuration.

Additionally, the controller 232 may be configured to receive input regarding detection of arcing or fire within the battery enclosures, e.g., from optical sensors. Additionally, in certain embodiments, the controller 232 may include a circuit (such as an analog circuit) which includes a current signal squaring element and capacitor voltage proportional to the load circuit maximum energy ($I^2$)t. This circuit could than provide an input to the controller module 233. Additionally, in certain embodiments, the controller module 233 could also compensate for circuit protection device environmental conditions (such as ambient temperature, humidity, altitude). Additionally, in certain embodiments, the PFD controller 232 can also adjust the trip level based on the actual current history logs. E.g., the protection could adapt to variations in the run time history.

Figure 4:
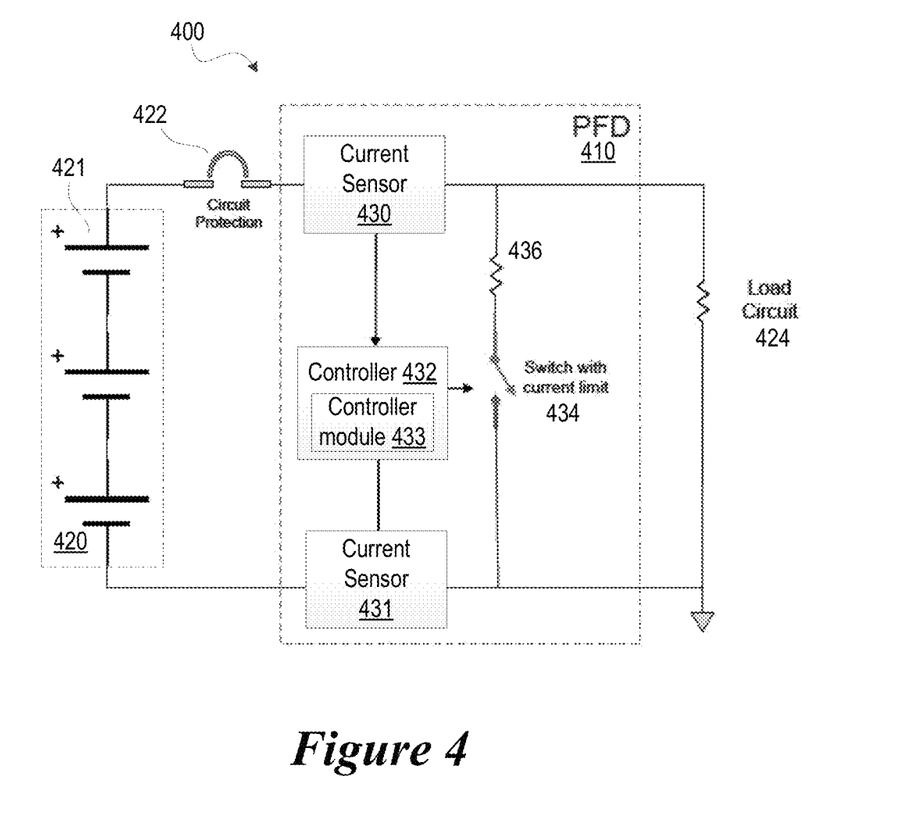
FIG. 4 shows a block diagram of a battery system having an alternate PFD protection circuit.

Also for example, other implementations of the PFD protection circuit are contemplated. For example, FIG. 4 shows a block diagram of a battery system 400 having an alternate PFD protection circuit 410. More specifically, the battery system 400 includes a power source 420 (e.g., a battery or string of batteries 421), a circuit protection device 422, the PFD protection circuit 410 as well as a load circuit 424.

The PFD protection circuit 410 includes current sensors 430, 431, a controller 432 (which includes a controller module 433) and a current limiting switch 434. The PFD protection circuit 410 further includes a resistor 436 coupled in series with the switch 434. The current limiting switch 434 and the resistor 436 are coupled in parallel with the load circuit 424.

This alternate PFD protection circuit 400 includes an additional current sensor 433. The current sensor 422 monitors the current leaving the power source 420 and the current sensor 433 monitors the current entering the power source 420. The current sensor 433 is coupled between the positive terminal of the power source 420 and the load while the current sensor 433 is coupled between a negative terminal of the power source and the load.

Under normal operating conditions, substantially (e.g., +/−10%) the same current is expected to be leaving the positive terminal as returning to the negative terminal. Should this condition not be the case the controller module 433 takes this information into account when making a determination whether to close the switch 434.

Figure 5:
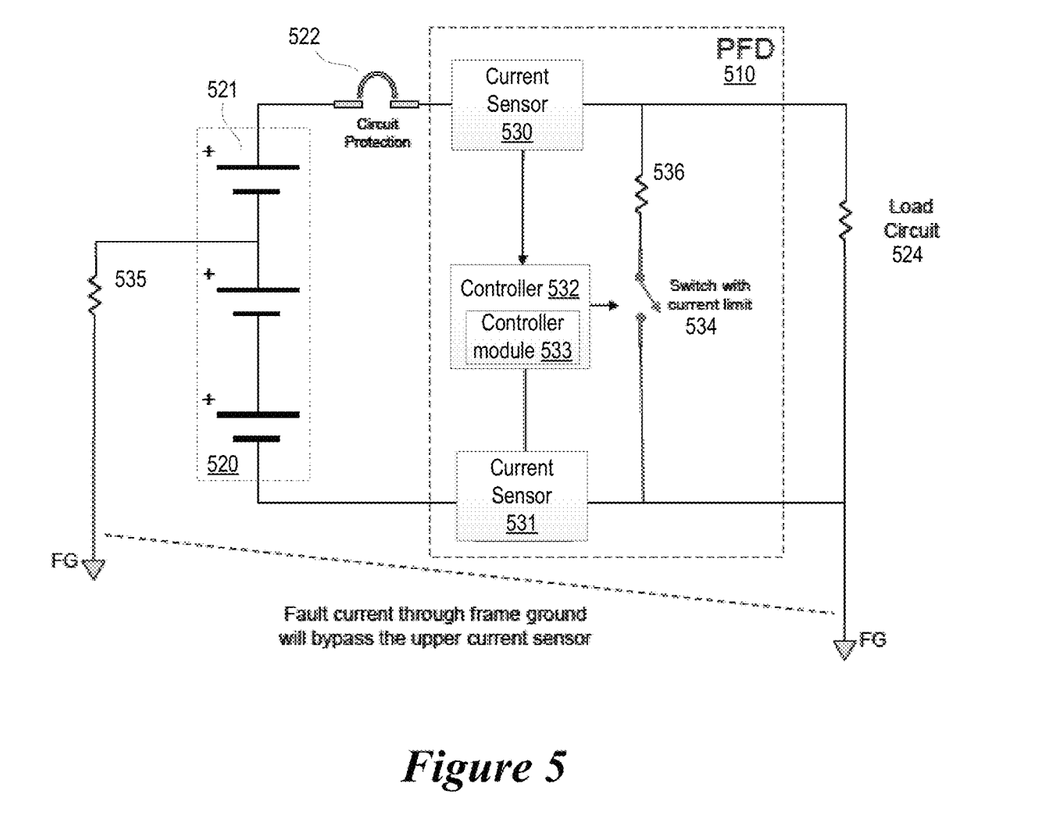
FIG. 5 shows a block diagram of a battery system having another alternate PFD protection circuit.

FIG. 5 shows a block diagram of a battery system 500 having another alternate PFD protection circuit 510. For a grounded negative power source 520, it is important that the current sensor 533 be placed between the negative power source terminal and frame ground (FG). In many battery systems 500, a conductive battery enclosure is coupled to a system ground (also referred to as earth, protective earth or frame ground) to meet safe requirements. A fault current path (represented by resistor 535) from anywhere along the series battery string to the battery enclosure may cause a current imbalance that can be detected by the two current sensors and used by the controller module 533 to control the shunt switch. Both the load current and the fault current pass through the lower current sensor, but only the load current passes through the top current sensor.

More specifically, the battery system 500 includes a power source 520 (e.g., a battery or string of batteries 521), a circuit protection device 522, the PFD protection circuit 510 as well as a load circuit 524. The PFD protection circuit 510 includes current sensors 530, 531, a controller 532 (which includes a controller module 533) and a current limiting switch 534. The PFD protection circuit 510 further includes a resistor 536 coupled in series with the switch 534. The current limiting switch 534 and the resistor 536 are coupled in parallel with the load circuit 524.

This alternate PFD protection circuit 500 includes an additional current sensor 533. The current sensor 522 monitors the current leaving the power source 520 and the current sensor 533 monitors the current entering the power source 520. The current sensor 533 is coupled between the positive terminal of the power source 520 and the load while the current sensor 533 is coupled between a negative terminal of the power source and the load.

Under normal operating conditions, substantially (e.g., +/−10%) the same current is expected to be leaving the positive terminal as returning to the negative terminal. Should this condition not be the case the controller module 533 takes this information into account when making a determination whether to close the switch 534.

Alternately, some embodiments of a battery system may include a ground positive power source 520. For a configuration of a grounded positive then the lower current sensor is coupled between the positive battery string terminal and the frame ground.

What is claimed is:

1. A battery system comprising:
   a power source;
   a load coupled to the power source; and,
   a preemptive Fuse Driver (PFD) protection circuit coupled in parallel between the power source and the load, the PFD protection system comprising a sensor, and a controller and a switch, the PFD protection circuit forcing high battery currents through the switch causing the switch of the PFD protection circuit to substantially instantly close; and wherein
   the controller comprising a PFD control module, the PFD control module allows protection to be tuned specifically to source and load characteristics of the power source, tuning the protection comprises providing predictable interruption of moderate battery currents over time as well as forcing high battery currents through the switch, the moderate battery currents comprising currents up to 250% of a rating of the battery and the high battery currents comprising currents greater than 300% of the rating of the battery;
   the PFD control module accumulates an energy accumulator value representing energy transferred to the load over time; and,
   the PFD control module generates a command which causes the controller to close the switch when the energy accumulator value reaches a threshold.

2. The battery system of claim 1, further comprising:
   a circuit protection device, the circuit protection device being coupled in series between the power source and the load.

3. The battery system of claim 1, wherein
   the PFD control module tunes the protection in real time.

4. The battery system of claim 1, wherein
   the threshold corresponds to a maximum load energy value for the power source.

5. The battery system of claim 4, wherein
   the maximum load energy value for the power source corresponds to a value of a square of a maximum short term overload current drawn from the power source multiplied by a time value, the time value representing a time at maximum overload current.

6. The battery system of claim 1, wherein
   the PFD protection circuit further comprises another current sensor, the current sensor being coupled to a first terminal of the power source and the another current sensor being coupled to a second terminal of the power source.

7. A data processing system comprising:
   a host computer;
   a power system coupled to the host computer, the power system comprising
   a power source; and,
   a preemptive Fuse Driver (PFD) protection circuit coupled in parallel between the power source and the load, the PFD protection system comprising a sensor, and a controller and a switch, the PFD protection circuit forcing high battery currents through the switch causing the switch of the PFD protection circuit to substantially instantly close; and wherein
   the controller further comprises a PFD control module, the PFD control module allows protection to be tuned specifically to source and load characteristics of the power source, tuning the protection comprises providing predictable interruption of moderate battery currents over time as well as forcing high battery currents through the switch, the moderate battery currents comprising currents up to 250% of a rating of the battery and the high battery currents comprising currents greater than 300% of the rating of the battery;
   the PFD control module accumulates an energy accumulator value representing energy transferred to the load over time; and,
   the PFD control module generates a command which causes the controller to close the switch when the energy reaches a threshold.

8. The data processing system of claim 7, wherein the power system further comprises:
   a circuit protection device, the circuit protection device being coupled in series between the power source and the load.

9. The data processing system of claim 7, wherein the PFD control module tunes the protection in real time.

10. The data processing system of claim 7, wherein the threshold corresponds to a maximum load energy value for the power source.

11. The data processing system of claim 10, wherein
    the maximum load energy value for the power source corresponds to a value of a square of a maximum short term overload current drawn from the power source multiplied by a time value, the time value representing a time at maximum overload current.

12. The data processing system of claim 7, wherein
    the PFD protection circuit further comprises another current sensor, the current sensor being coupled to a first terminal of the power source and the another current sensor being coupled to a second terminal of the power source.

13. A battery system comprising:
    a power source;
    a load coupled to the power source; and, a preemptive Fuse Driver (PFD) protection circuit coupled in parallel between the power source and the load, the PFD protection system comprising a first sensor, a second sensor, a controller and a switch, the first sensor being coupled to a first terminal of the power source and the second current sensor being coupled to a second terminal of the power source, the PFD protection circuit forcing high battery currents through the switch causing the switch of the PFD protection circuit to substantially instantly close; and wherein the controller comprises a PFD control module, the PFD control module allowing protection to be tuned specifically to source and load characteristics of the power source, tuning the protection comprises providing predictable interruption of moderate battery currents over time as well as forcing high battery currents through the switch, the moderate battery currents comprising currents up to 250% of a rating of the battery and the high battery currents comprising currents greater than 300% of the rating of the battery;

the PFD control module accumulates an energy accumulator value representing energy transferred to the load over time; and, the PFD control module generates a command which causes the controller to close the switch when the energy accumulator value reaches a threshold.

14. The battery system of claim 13, further comprising:

a circuit protection device, the circuit protection device being coupled in series between the power source and the load.

15. The battery system of claim 13, wherein the threshold corresponds to a maximum load energy value for the power source;

the maximum load energy value for the power source corresponds to a value of a square of a maximum short term overload current drawn from the power source multiplied by a time value, the time value representing a time at maximum overload current.

* * * * *